(12) United States Patent
Ruschin et al.

(10) Patent No.: US 7,013,053 B2
(45) Date of Patent: Mar. 14, 2006

(54) POLARIZATION INDEPENDENT ELECTRO-OPTICAL DEVICE FOR MODULATION OF LIGHT

(75) Inventors: Shlomo Ruschin, Herzlia (IL); Arkady Kaplan, East Brunswick, NJ (US)

(73) Assignee: Ramot At Tel Aviv University Ltd., Tel Aviv (IL)

( * ) Notice: Subject to any disclaimer, the term of this patent is extended or adjusted under 35 U.S.C. 154(b) by 347 days.

(21) Appl. No.: 10/356,778

(22) Filed: Feb. 3, 2003

(65) Prior Publication Data

US 2003/0133647 A1    Jul. 17, 2003

Related U.S. Application Data

(63) Continuation-in-part of application No. 09/490,255, filed on Jan. 24, 2000, now abandoned.

(51) Int. Cl.
  *G02F 1/07*    (2006.01)
  *G02F 1/03*    (2006.01)
  *G02B 6/27*    (2006.01)

(52) U.S. Cl. .............. 385/2; 385/40; 385/11
(58) Field of Classification Search .......... 385/1, 385/2, 4, 8, 9, 11, 39, 40
See application file for complete search history.

(56) References Cited

U.S. PATENT DOCUMENTS

| | | | | |
|---|---|---|---|---|
| 4,262,994 A | * | 4/1981 | Sheem .......................... | 385/8 |
| 4,291,939 A | * | 9/1981 | Giallorenzi et al. ............ | 385/9 |
| 4,691,984 A | * | 9/1987 | Thaniyavarn .................. | 385/8 |
| 4,818,063 A | * | 4/1989 | Takizawa ....................... | 385/8 |

* cited by examiner

*Primary Examiner*—Sarah Song
(74) *Attorney, Agent, or Firm*—Mark M. Friedman

(57) ABSTRACT

Electro-optical method and device for modulation of light are presented providing a substantially balanced voltage-phase response of the device in two orthogonal polarization directions substantially irrespective of applied voltages. The device comprises a crystal material of a predetermined orientation of the plane of propagation of light therethrough, formed with at least one waveguide channel directed in a predetermined direction, and at least two electrodes accommodated at opposite sides of the waveguide channel. The substantially balanced voltage-phase response is achieved by shifting the electrodes relative to the axis of the waveguide channel a predetermined distance in a certain direction. The device may be designed so as to operate as a phase modulator or an amplitude modulator.

13 Claims, 6 Drawing Sheets

POLARIZATION INDEPENDENT ELECTRO-OPTICAL DEVICE FOR MODULATION OF LIGHT

This is a Continuation-In-Part of U.S. patent application Ser. No. 09/490,255, filed Jan. 24, 2000 now abandoned.

FIELD OF THE INVENTION

This invention is generally in the field of integrated optics and relates to a polarization independent integrated electro-optical device for modulation of light.

BACKGROUND OF THE INVENTION

In many integrated optical devices, signals are carried within waveguide channels, which are formed by modifying the surface of a substrate. If the waveguide is optically active, the substrate material is in many occasions anisotropic, usually being a crystal having the ability to rotate the plane of polarization of light passing therethrough. Electro-optically active waveguides have electrodes formed in the close vicinity thereof.

The fundamental phenomenon that accounts for the operation of electro-optic modulators and switches is the change in the index of refraction produced by the application of an external electric field. When an electric field is applied across an optically active medium, the distribution of electric charge within it is distorted so that the polarizability and, hence, the refractive index of the medium changes anisotropically. The result of this electro-optic effect may be to introduce new optic axes into naturally doubly refracting crystals, or to make naturally isotropic crystals doubly refracting. In the most general case, this effect is non-isotropic, and contains both linear (Pockels) and nonlinear (Kerr) effects. In commonly used waveguide materials, the nonlinear (quadratic) Kerr electro-optic coefficient is relatively weak.

Thus, an electro-optic crystal will in general exhibit birefringence, if an electric field is applied in a given direction. The most general expression for the linear change in the refraction index ellipsoid components due to the application of an electric field E is given by:

$$\Delta\left(\frac{1}{n^2}\right)_i = \sum_{j=1}^{3} r_{ij} E_j$$

where i=1,2,3,4,5,6 and where j=1,2,3 are associated with X,Y,Z respectively, the 6×3 matrix $[r_{ij}]$ being the electro-optic tensor.

Owing to the fact that substrate materials with a strong electro-optic effect are inherently non-isotropic, the functional parameters of the devices will depend on the polarization state of the light propagating within the medium. Such polarization dependence of functional parameters is one of the main limitations of many integrated optical devices based on substrates of low crystal symmetry. As well known, practically all the presently installed fiber-optic infrastructures consist of standard single-mode fibers that do not preserve the state of polarization of the transmitted light. LiNbO$_3$ material has a mature technology for the processing of integrated optical devices that is nowadays implemented routinely in commercial products, most of them being, however, polarization dependent. This fact limits the scope of application of this technology to cases where the device is placed directly following a polarized laser source, or alternatively, implies utilization of costly polarization-maintaining fibers in the network.

The present trend of all-optical networking dictates the need for polarization-independent devices. It is therefore of prime interest to develop configurations that allow polarization independent functioning of devices.

Attempts that have been made to provide polarization-independent modulators generally utilize two different approaches. The first approach is based on independent electro-optic control of the modulation of both polarizations. According to this technique, specific elements of the electro-optic tensor are used for separately modulating TE and TM modes propagating along the waveguide. Devices of this kind typically require two independent electrode sets to provide the desired electric field for both TE and TM polarizations. This approach is disclosed, for example, in the following publications:

(1) J. Ctyrocy et al., "*Two-mode-interference Ti:LiNbO$_3$ electrooptic polarization independent switch or polarization splitter*", Electron. Lett., Vol. 23, No. 27, pp. 965–966, 1991; and (2) N. Kuzuta, K. Takakura, "*Polarization insensitive optical devices with power splitting and switching functions*", Electron. Lett., vol. 27, No. 2, pp. 157–158, 1991.

According to the second approach, the functional dependence on the state of polarization of the input light is eluded by using a specific orientation of the crystal and propagation direction of light signal. This is disclosed, for example, in the following publications:

(3) J. Saulnier et al., "*Interferometric-type polarization splitter on Z-propagating LiNbO$_3$:Ti*", Electron. Lett., vol. 26, No. 23, pp. 1940–1941, 1991.

(4) Ed. J. Murphy et al., "*Low voltage, polarization-independent LiNbO$_3$ modulators*", Proc. $7^{th}$ Eur. Conf. on Int. Opt. (ECIO'95), pp. 495–498, 1995);

(5) J. Hauden et al., "*Quazi-polarization-independent Mach-Zehnder coherence modulator/demodulator integrated in Z-propagating Lithium Niobate*", IEEE Journal of Quantum Electronics, vol. 30, No. 10, pp. 2325–2331, 1994.

According to the disclosures in the above documents (3), (4) and (5), the direction of propagation of the waveguide was parallel to the optical axis Z, and the largest electrooptic coefficient $r_{33}$ of LiNbO$_3$ was not used. Here, polarization-independent action is obtained at the cost of larger operating voltages or the device's length. Moreover, in these configurations, voltage induced polarization rotation is unavoidable in LiNbO$_3$ due to the appearance of the $r_{51}$ coefficient. This effect causes difficulty in the insertion of such a phase modulator in a Mach-Zehnder scheme.

According to another technique, disclosed in C. C. Chen et al. "*Phase correction by laser ablation of a polarization independent LiNbO$_3$ Mach-Zehnder modulator*", IEEE Photonics Technology letters, vol. 9, No. 10, pp. 1361–1363, October 1997, a residual phase correction between TE and TM electrooptic responses is obtained by the laser ablation process, decreasing the effective indices of the modes in one of the interferometric arms.

Yet other developed techniques are based on coherence modulation (H. Porte et al., "*Integrated waveguide modulator using a LiNbO$_3$ TE-TM converter for electrooptic coherence modulation of light*", Journal of Lightwave technology, vol. 6, No. 6, pp. 892–897, 1988), or on the use of a multi-electrode configuration utilizing the $r_{51}$ component of the electro-optic tensor (W. K. Burns et al., "*Interferometric waveguide modulator with polarization independent*

*operation*", Appl. Phys. Lett, vol. 33, No. 11, pp. 944–947, 1978). Generally speaking, most of the known techniques aimed at providing a polarization-independent electro-optic device require either complicated technology, or considerable sacrifice in operation voltages and length.

Additional techniques aimed at developing configurations that allow polarization independent functioning of electro-optic switches are disclosed in the following publications:

(6) H. Okayama et al., "*Three-Guided Directional Coupler as Polarization Independent Optical Switch*", Electronics Letters, vol. 27, No. 10, pp. 810–812, 1991;

(7) P. J. Duthie et al., "*A polarization Independent Guided-Wave LiNbO$_3$ Electrooptic Switch Employing Polarization Diversity*". IEEE Photonics Technology Letters, vol. 3, No. 2, pp. 136–137, 1991;

(8) M. Kondo et al., "*Low-Drive-Voltage and Low-Loss Polarization-Independent LiNbO$_3$ Optical Waveguides Switches*", Electronics Letters, vol. 23, No. 21,pp. 1167–1169, 1987; and (9) P. Granestrand et al., "*Polarization Independent Switch and Polarization Splitter Employing $\Delta\beta$ and $\Delta k$ Modulation*", Electronics Letters, vol. 24, No. 18, pp. 1142–1143, 1988.

SUMMARY OF THE INVENTION

There is accordingly a need in the art to facilitate polarization insensitiveness of integrated optical devices, by providing a novel electro-optical device for modulation of light designed so as to have polarization independent operation.

The main idea of the present invention is based on the following. When passing light through a waveguide, different polarizations of an output light signal are associated with different influence of an applied field on the light propagation coefficient, $\beta$. Polarization independence of the electro-optic device signifies that the following condition is satisfied:

$$\beta_2^{TE} - \beta_2^{TM} = 0$$

wherein $\beta_2^{TE}$ and $\beta_2^{TM}$ are changes in the propagation coefficients of TE and TM light components, respectively, caused by the applied field. Both, $\beta_2^{TE}$ and $\beta_2^{TM}$ are functions of the following variables: an operating wavelength, the orientation of the crystal cut (i.e., the direction normal to the plane where the waveguides are fabricated), the direction of propagation of the wave-guided light, and the location of electrodes relative to the waveguide's axis. The latter is associated with certain given parameters of a waveguide-containing structure, such as the thickness of a buffer layer, if any, distance between the electrodes, dimensions of the waveguide, and the refractive index profile.

According to the present invention, the above condition can be achieved for a wide range of operating voltages by properly designing the waveguide-electrode layout of the electro-optic device in accordance with certain given parameters of the device.

As indicated above, changes of refraction index of a crystal waveguide medium, induced by the application of an external electric field E, can in general be anisotropic. Anisotropic nature of the electro-optic tensor signifies that different polarizations will be affected by different elements of the electro-optic tensor. As disclosed in A. Yariv "*Optical Electronics*", 4$^{th}$ edition, Saunders Publ., 1991, the matrix form of the above equation for a specific case of a crystal having symmetry like in LiNbO$_3$ structure can be written as follows:

$$\left(\frac{1}{n^2}\right) = \begin{pmatrix} \frac{1}{n_0^2} - r_{22}E_Y + r_{13}E_Z & -r_{22}E_Y & r_{51}E_X \\ -r_{22}E_X & \frac{1}{n_0^2} + r_{22}E_Y + r_{13}E_Z & r_{51}E_Y \\ r_{51}E_X & r_{51}E_Y & \frac{1}{n_e^2} + r_{33}E_Z \end{pmatrix}$$

wherein $(1/n^2)$ now denotes the tensor representing the entire index ellipsoid after the application of an electric field; $n_o$ and $n_e$ are refraction indices for, respectively, ordinary (TE) and extraordinary (TM) polarization components; $E_x$, $E_y$ and $E_z$ are, respectively, x-, y- and z-components of the external electric field. Utilizing a z-cut crystal material, and an x-propagating waveguide, the field induced has only y- and z-components, and therefore mainly three electro-optic coefficients, ($r_{33}$ $r_{13}$ $r_{22}$), are utilized when designing an electro-optic device with a polarization independent operation.

To achieve a balanced voltage-phase response of an electro-optic device in two orthogonal polarization directions, two main factors should be taken into consideration when constructing the device: (1) appropriate coefficients of the electro-optic tensor defined by the orientation of a plane of propagation of light in the crystal material and the direction of propagation of light within a waveguide made in this crystal material, and (2) an appropriate shift of electrodes relative to the axis of the waveguide, depending on the certain given parameters of the device.

There is thus provided, according to one aspect of the present invention, a method for designing an electro-optical device for modulation of light having a substantially balanced voltage-phase response in two orthogonal polarization directions, wherein the device comprises at least one waveguide channel made in a crystal material and at least two electrodes accommodated at opposite sides of said at least one waveguide channel for applying an external electric field to the waveguide channel, the method comprising the steps of:

(a) providing a predetermined orientation of the plane of propagation of light in the crystal;

(b) providing a predetermined direction of propagation of the light within said at least one waveguide;

(c) providing a desired electrodes-waveguide layout by shifting said at least two electrodes from an axis of the waveguide channel a predetermined distance in a certain direction, the desired shift being such that, for given values of an operating wavelength and certain parameters of the device, said substantially balanced voltage-phase response of the device is provided substantially irrespective of the applied voltages.

The desired electrode shift is determined by considering appropriate coefficients of an electro-optical tensor so as to provide the satisfaction of the following condition:

$$\beta_2^{TE} = \beta_2^{TM} = 0$$

wherein $\beta_2^{TE}$ and $\beta_2^{TM}$ are changes in the propagation coefficients of, respectively, TE and TM light components induced by the application of the external electric field created by applying a voltage difference between the electrodes.

According to another aspect of the present invention, there is provided an electro-optical device for modulation of light comprising:
(i) at least one waveguide channel made within a crystal material of a predetermined orientation of the plane of propagation of light therein and directed in a predetermined direction; and
(ii) at least two electrodes accommodated at opposite sides of said at least one waveguide channel for applying an external electric field to the waveguide channel, wherein a predetermined electrode-waveguide layout is provided by shifting said at least two electrodes relative to the axis of the waveguide channel a predetermined distance in a certain direction, wherein said predetermined electrode-waveguide layout is such that, for given values of an operating wavelength and certain parameters of the device, said substantially balanced TE–TM voltage-phase response of the device is provided irrespective of the applied voltages More specifically, the present invention is used with a z-cut, x-propagating LiNbO$_3$ crystal, and is therefore described below with respect to this application.

There is also provided according to the teachings of the present invention, an electro-optical device for modulation of light comprising: (a) a waveguide formed from optically active material deployed within at least one waveguide channel, a portion of said waveguide having a central axis of symmetry; and (b) an electrode configuration including at least two electrodes deployed in operative relation to said portion of said waveguide, wherein said at least two electrodes are deployed asymmetrically relative to said central axis of symmetry with at least one of said electrodes overlapping said channel partially such that an actuation voltage applied between said two electrodes results in a substantially equal affect on both TE and TM polarized components of radiation propagating along said waveguide.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
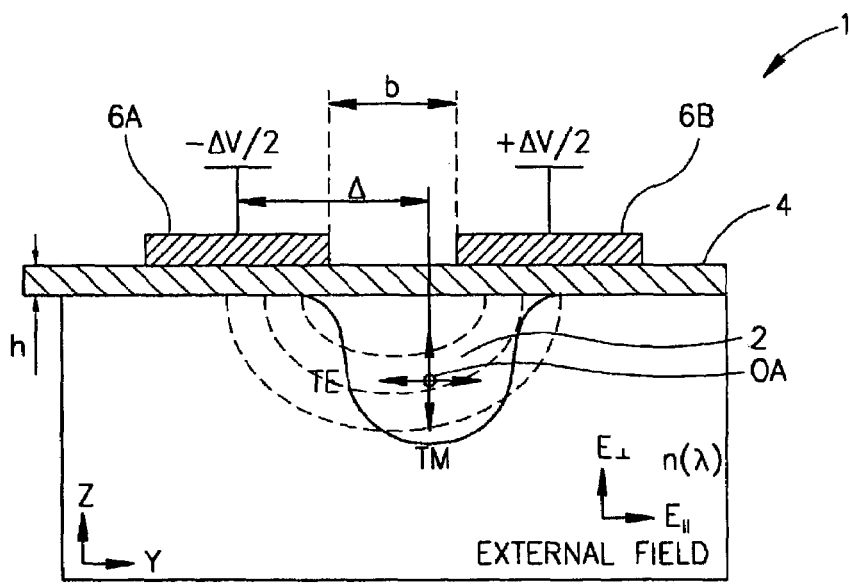
FIG. 1 is a schematic illustration of electrode-waveguide layout in an electro-optical device according to the invention for simultaneous phase modulation of TE and TM waves.

Referring to FIG. 1, there is illustrated a waveguide-electrode transverse cut of an electro-optic modulator 1, constructed and operated according to the invention. The modulator comprises a crystal waveguide 2 coated with an insulating SiO$_2$ buffer layer 4 having the thickness h, and two electrodes 6A and 6B accommodated at opposite sides of the waveguide 2 and spaced from each other a distance b. Both electrodes are positioned in an essentially non-symmetric fashion with respect to the waveguide center. The waveguide 2 may be produced by any known suitable technique, for example by in-diffusion of a deposited layer of titanium onto a substrate of lithium niobate. In the present example, z-cut, x-propagating LiNbO$_3$ crystal is used, but generally, any other suitable waveguide can be used, if the proper electro-optic tensor structure is provided. The electrode 6A is shifted from the symmetry center of the waveguide 2 (i.e., from an axis OA of the waveguide 2) a certain distance, $\Delta$, the purpose of which will be described further below. It should be noted that the use of the buffer layer 4 is optional being aimed at isolating the waveguide from the metal electrodes, thereby reducing power losses in the waveguide.

The applied voltage difference creates a modulating external electrical field E that has components in the y- and z-directions. Influences of these y- and z-components of the electrical field can be weighted for TE and TM modes in such a way that the effective refractive index changes induced by the electrodes on the waveguide are identical for both polarizations. The refraction index distributions in a waveguide for TE and TM polarizations can be written in the form:

$$n^{TE}(y,z) \approx n_o + \Delta n_1^{TE}(y,z) + \Delta n_2^{TE}(y,z)$$

$$n^{TM}(y,z) \approx n + \Delta n_1^{TM}(y,z) + \Delta n_2^{TM}(y,z)$$

wherein: $n_o$, $n_e$ are refractive indices of LiNbO$_3$ substrate for y- and z-directions, respectively; $\Delta n_1^{TE}$ and $\Delta n_1^{TM}$ are the changes in the refractive indices of TE and TM light components, respectively, caused by in-diffusion of titanium (this factor takes into account anisotropy caused by differences in the diffusion constants in both axis); $\Delta n_2^{TE}$ and $\Delta n_2^{TM}$ are the perturbations in the refractive indices of TE and TM light components, respectively, caused by electrostatic field E having the explicit form:

$$\Delta n_2^{TE}(y,z) = -\frac{n_o^3}{2}[r_{22}E_Y(y,z) + r_{23}E_z(y,z) + 0(r_{42})]$$

$$\Delta n_2^{TM}(y,z) = -\frac{n_e^3}{2}[r_{33}E_z(y,z) - 0(r_{42})]$$

The small correction $O(r_{42})$ corresponds to slight rotation of the principal axes induced by the external electric field. These terms will induce coupling between the TE and TM modes. As known, Lithium Niobate is characterized by the large material birefringence. Therefore, the large phase velocity mismatch between the TE and TM modes makes TE–TM conversion negligibly small in this case (typically less than $10^{-4}$).

Turning back to the above expressions for $\Delta n_2^{TE}$ and $\Delta n_2^{TM}$, for Lithium Niobate, the coefficient $r_{33}$ is about three times larger than the coefficient $r_{23}$ and ten times larger than the coefficient $r_{22}$. By equating the values of the expressions for TE and TM voltage-induced increments in the refractive index, it can be found that the balanced dual polarization action will be achieved by means of a proper ratio between $E_Y$ and $E_Z$. In a bulk material, this situation will be attained, if the electric field vector is directed in an angle of approximately 100 with respect to the y-axis. Keeping this fact in mind, and returning back to the waveguide configuration of FIG. 1, it is apparent that a proper shift between the electrodes 6A–6B and the waveguide axis OA must exist where the two contributions are exactly balanced. To this end, as shown in FIG. 1, the orientation of the external electric field has to be predominantly in the y-direction. The operation voltage in this situation turns out to be around two times larger than that for a conventional (i.e., polarization dependent) configuration where $r_{33}$ is solely used.

Figure 2A:
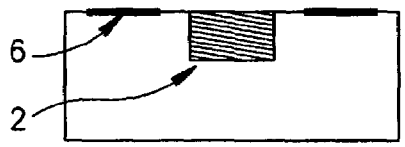
FIGS. 2a and 2b illustrate conventional electrode dispositions for acting on TE and TM modes, respectively.
Figure 2B:
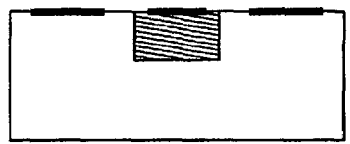

In the following we describe general considerations that determine the direction and the amount in which the electrodes are to be shifted from the axis of symmetry, in order to attain balanced polarization influence. This method is applicable also to crystals other than Lithium Niobate, provided the suitable conditions described in the following are fulfilled. Turning back to the general tensorial relationship, and choosing the axis perpendicular to the surface ("cut") as z-axis, and the direction of propagation as x, the polarization of the optical wave is mainly contained in the y-z plane, and the applied electrical field is also confined to this plane. FIGS. 2a and 2b illustrate the z-cut crystal with the waveguide 2 directed along the x-axis, showing, respectively, the TE- and TM-configurations of electrodes 6, the net polarization being entirely in the y- and z-direction. The reduced equations for the index variations in the y and z-directions take the form:

$$\Delta\left(\frac{1}{n^2}\right)_2 = r_{22}E_y + r_{23}E_z$$

$$\Delta\left(\frac{1}{n^2}\right)_3 = r_{32}E_y + r_{33}E_z$$

In a shifted electrode disposition an average component over the entire mode can be calculated. The condition for polarization independent function can be formulated by equalizing the average electrical field dependent terms of the two last equations, explicitly:

$$\frac{\langle E_y \rangle}{\langle E_z \rangle} = \frac{r_{33} - r_{23}}{r_{22} - r_{32}}$$

Here, averaging is made over the entire waveguide mode. Since for the TE-configuration of electrodes (FIG. 2a) the average polarization is completely in the transversal (y-direction), while in the TM-configuration of electrodes (FIG. 2b) the polarization is entirely in the z-direction, there will necessarily be such a shift value $\Delta$ that the average of both TE- and TM-components fulfills the above relationship. The only condition for this is the non-cancellation of the numerator and denominator of the fraction. Explicitly, the relevant tensor components need to fulfill the following conditions:

$$r_{22} - r_{32} \neq 0$$

$$r_{33} - r_{23} \neq 0$$

Figure 2C:
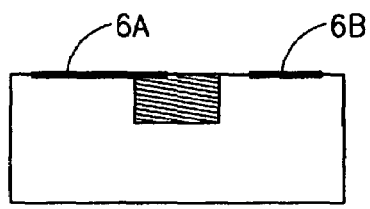
FIGS. 2c and 2d illustrate configurations of electrodes shifted as to act distinctly on different polarizations of light propagating in a waveguide.
Figure 2D:
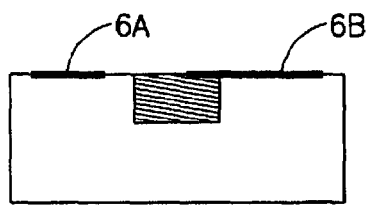

The relative sign of these two expressions will dictate whether the sign of the electrode shift $\Delta$ will be positive or negative, as shown in FIGS. 2c and 2d, respectively. In the specific case of $LiNbO_3$ as the active material, the coefficient $r_{32}$ is zero.

Let us consider two different operational modes of the modulator 1 (FIG. 1), namely phase and amplitude modulations, in a polarization independent manner.

Polarization-Independent Phase Modulation

Referring to the above equations for $\Delta n_2^{TE}$ and $\Delta n_2^{TM}$, the propagation constants of the waveguide mode can be divided into approximately three contributing parts, that is:

$$\beta^{TE} \approx k_0 n_o + \beta_1^{TE} + \beta_2^{TE}$$

$$\beta^{TM} \approx k_0 n_e + \beta_1^{TM} + \beta_2^{TM}$$

wherein: $\beta_1^{TE}$ and $\beta_1^{TM}$ are the contributions of TE and TM modes, respectively, to propagation constant as a result from the diffusion of Ti (solving the modal equation for the two first terms in the above equations for $\Delta n_1^{TE}$ and $\Delta n_1^{TM}$); and $\beta_2^{TE}$ and $\beta_2^{TM}$ are the added perturbations each depending on the voltage-induced changes in the corresponding refractive index ($\Delta n_2$). From the Variation Theorem, this consideration is evaluated by means of:

$$\beta_2^{TE} \approx \frac{k_0 \iint |U^{TE}(y,z)|^2 \cdot \Delta n_2^{TE}(y,z) dy dz}{\iint |U^{TE}(y,z)|^2 dy dz}$$

$$\beta_2^{TM} \approx \frac{k_0 \iint |U^{TM}(y,z)|^2 \cdot \Delta n_2^{TM}(y,z) dy dz}{\iint |U^{TM}(y,z)|^2 dy dz}$$

wherein the functions $U^{TE}(y,z)$ and $U^{TM}(y,z)$ are the respective mode functions found by solving the waveguide modes without the presence of an external field.

Due to the crystal birefringence in $LiNbO_3$, the two polarizations TE and TM are mostly de-coupled in this configuration. Polarization independent phase modulation will be attained, provided that TE–TM equalization in the voltage-induced part of the propagation constant is attained for a wide range of variations $\Delta V$. To achieve the polarization independence, the following condition should be satisfied:

$$\Delta\beta = \beta_2^{TE}(\lambda, h, \Delta V, -\Delta) \beta_2^{TM}(\lambda, h, \Delta V, \Delta) = 0$$

wherein $\lambda$ is the operating wavelength, $\Delta$ is the electrode shift from the symmetry center of the unperturbed guide, and h is the thickness of the insulating $SiO_2$ buffer layer.

Figure 3A:
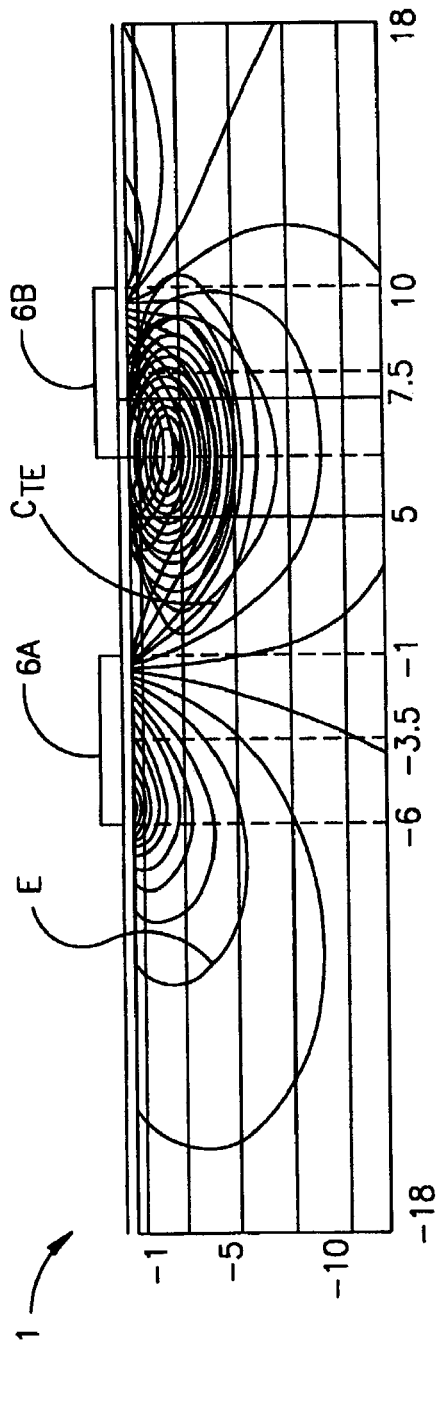
FIGS. 3a and 3b are schematic illustrations of an optical field mapping and induced refractive index perturbation for TE and TM polarizations, respectively, in the device of FIG. 1.
Figure 3B:
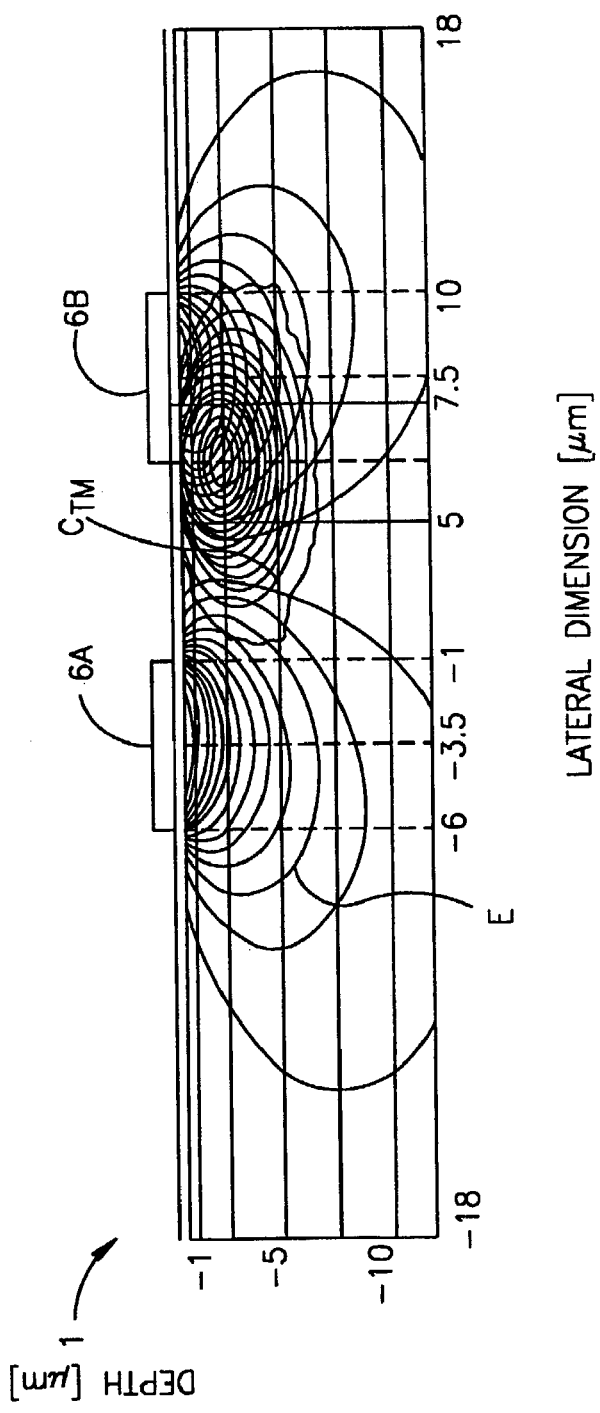

Numerical procedures were implemented in order to solve the conditions for which $\Delta\beta(\lambda, h, \Delta) = 0$. The procedures were started with an accurate mapping of the electrical field E induced by the coplanar electrodes 6A and 6B. This is illustrated in FIGS. 3a and 3b showing lines of constant field-induced refractive index perturbation E and contour lines $C_{TE}$ and $C_{TM}$ of optical power density for TE- and TM-modes, respectively within the waveguide structure.

The mapping was performed by finding the distribution of charges in the electrodes 6A and 6B, followed by summation of the contributions of each charge segment to the total electric field at each point. This technique is known, being disclosed, for example, in the following documents:

S. Ramo et al., "*Fields and Waves in Communication Electronics*", John Wiley & Sons, $2^{nd}$ed, 1984;

O. G. Ramer, "*Integrated Optic Electrooptic Modulator Electrode Analysis*", IEEE Journal of Quantum Electronics, vol. QE-18, No. 3, pp. 386–392, 1982

D. Marcuse, "*Optimal Electrode Design for Integrated Optics Modulators*", IEEE Journal of Quantum Electronics, vol. QE-18, No. 3, pp. 393–398, 1982.

After mapping the field, the index perturbation for each polarization was computed via the tensor relationships implied in the above equations for $\Delta n_2^{TE}$ and $\Delta n_2^{TM}$. Following the mapping of the index perturbation, calculation of the unperturbed modes was performed by means of a known BPM-based method disclosed, for example, in the following documents:

M. D. Feit et al., "*Comparison of calculated and measured performance of diffused channel-waveguide couplers*", J. Opt. Soc. Am., vol. 73, No. 10. Pp. 1296–1304, 1983;

Y Chung, N. Dagli, "*Explicit finite difference beam propagation method application to semiconductor rib waveguide Y-junction analysis*", Electron. Lett., vol. 26, No. 11, pp. 711–713, 1990.

Once the unperturbed mode and the voltage-induced index perturbation were accurately mapped, the values of $\beta_2^{TE}$ and $\beta_2^{TM}$ were calculated by the following two known methods (both furnishing practically the same results):

1. Direct application of the Variation Integral in the above equations;
2. Application of the same BPM-based method, now to the combined Ti-in-diffused and voltage-perturbed guides.

Figure 4:
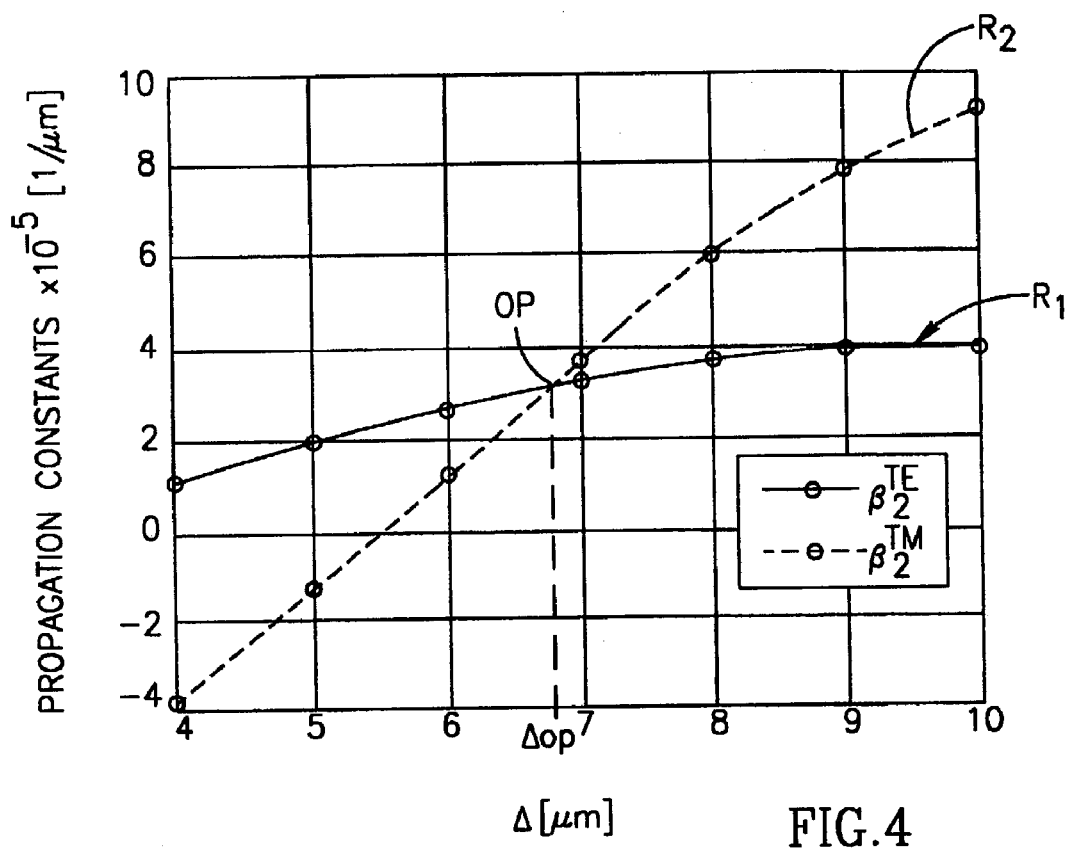
FIG. 4 graphically illustrates the dependence of the electrically induced perturbations $\beta_2^{TE}$ and $\beta_2^{TM}$ of TE and TM polarizations, respectively, on the value of the waveguide-electrode layout shift, $\Delta$, for a determined value of applied voltage.

Reference is made to FIG. 4, showing two graphs $R_1$ and $R_2$ corresponding, respectively, to the dependence of $\beta_2^{TE}$ and $\beta_2^{TM}$ on the value of electrode-waveguide layout shift $\Delta$. These graphs present calculation results utilizing the following conditions: $\Delta V=10V$; $\lambda=155$ μm; h=0.1 μm. As shown, the operating point OP, where the perturbations for both polarizations are equal (i.e., $\Delta\beta=0$), corresponds to the electrode-waveguide shift of $\Delta_{op}=6.78$ μm.

Thus, under the above conditions (i.e., parameters for applied voltage, operating wavelength, the buffer layer thickness and the electrode-waveguide layout shift), the device simultaneously modulates TE and TM signals with identical voltage-phase efficiencies.

Thereafter, the effect of buffer thickness on the operation point and tolerance in electrode shift was investigated. Two different values of buffer thickness and several voltages were used in order to observe the behavior of the function $\Delta\beta$. The results are illustrated in FIGS. 5 and 6.

Figure 5:
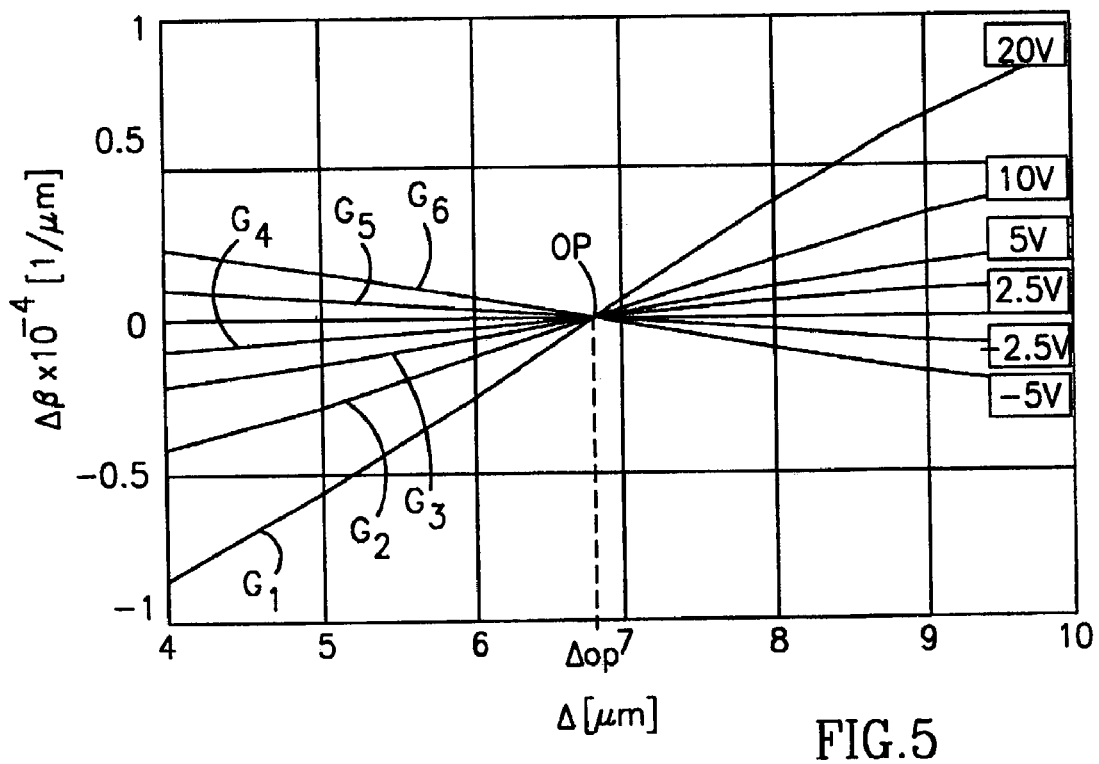
FIG. 5 graphically illustrates a mismatch between TE and TM voltage-induced perturbations, $(\beta_2^{TM}-\beta_2^{TE})$, versus the waveguide-electrode layout shift, $\Delta$, for different applied voltages.

FIG. 5 shows six graphs $G_1$–$G_6$ corresponding to the difference in voltage perturbations between the two modes for six different values of bias voltages, respectively. As shown, the operating value of electrode-waveguide layout shift $\Delta_{op}$, i.e., the value equalizing the phase-voltage dependence, is independent of the bias voltage. Indeed, biasing the device by $\Delta V=20V$, $\Delta V=10V$, $\Delta V=5V$, $\Delta V=2.5V$, $\Delta V=2.5V$ and $\Delta V=-5V$, does not change the operating value of electrode shift $\Delta_{op}$ significantly.

Figure 6:
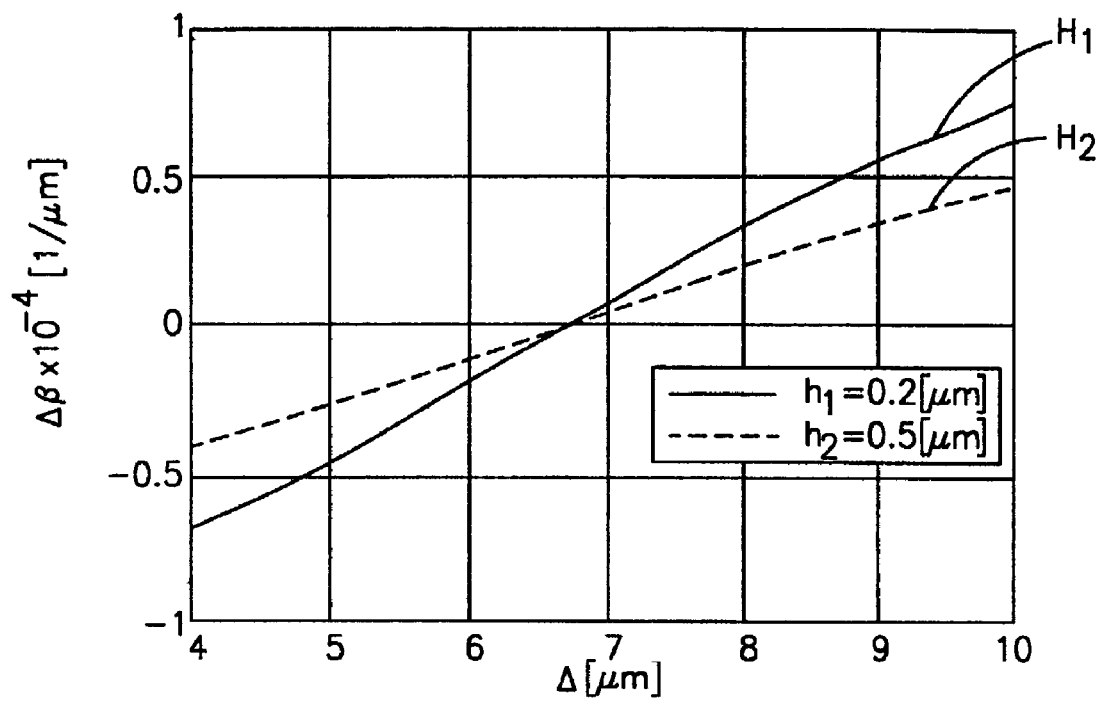
FIG. 6 graphically illustrates a mismatch between TE and TM perturbations, $(\beta_2^{TM}-\beta_2^{TE})$, versus the waveguide-electrode layout shift, $\Delta$, for different buffer layer thicknesses.

FIG. 6 illustrates two graphs $H_1$ and $H_2$ showing the $\Delta\beta$ as a function of $\Delta$ for two different values of the buffer thickness, namely $h_1=0.2$ μm and $h_2=0.05$ μm, respectively. It is apparent that the thinner buffer, the less constraint on fabrication errors in $\Delta$.

Figure 7:
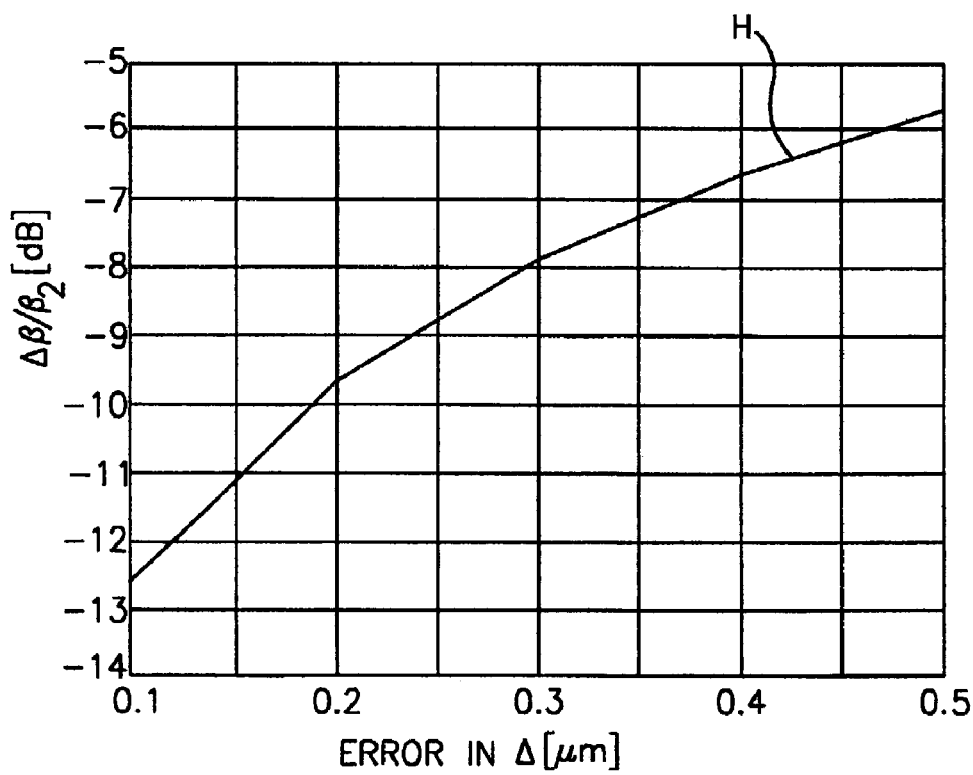
FIG. 7 graphically illustrates error $\Delta\beta/\beta_2$ versus $\Delta$ for a certain applied voltage.

Turning now to FIG. 7, illustrating the lithography tolerances required for a balanced TE-TM operation, a graph H shows the relative difference in induced phase ($\Delta\beta/\beta_2$) as a function of the error in displaced $\Delta$. The following conditions were used: the applied bias $\Delta V=15V$ and the buffer thickness h=0.15 μm. Considering the condition of updated semiconductor processing lithography (i.e., feature sizes of 0.18 μm are nowadays implemented involving tolerances of less than 0.05 μm), the polarization dependency in phase modulation, $\Delta\beta/\beta_2$ can be controlled to be less than (−13) dB.

It should be noted, although not specifically shown, that, generally, several given parameters of the device have to be taken into account, when selecting the appropriate electrode shift value $\Delta$. These parameters include, the thickness of the buffer layer (if any), distance between the electrodes, dimensions of the waveguide, and refraction index profile. It should also be noted that the polarization dependence could be further controlled and reduced by means of temperature control.

Thus, the polarization-independent phase modulation is achieved by properly designing the electrode layout.

Polarization-Independent Amplitude Modulation

Figure 8A:
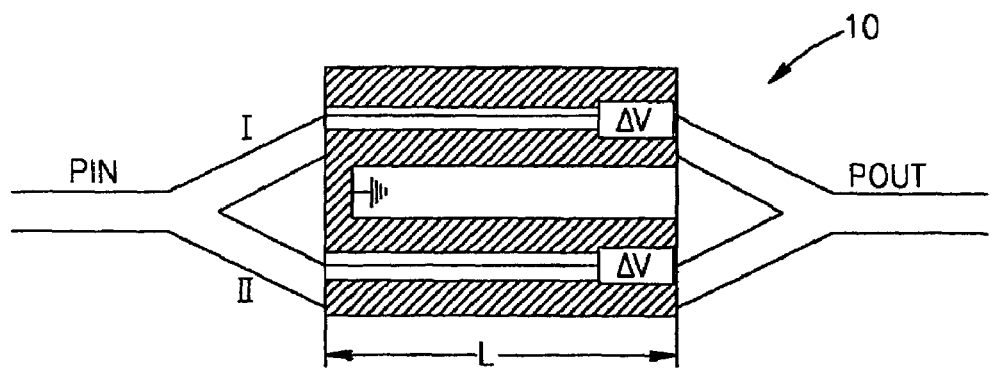
FIGS. 8a and 8b schematically illustrate an amplitude modulator according to the invention, and a push-pull electrode-waveguide layout thereof for simultaneous control of TE and TM polarizations.
Figure 8B:
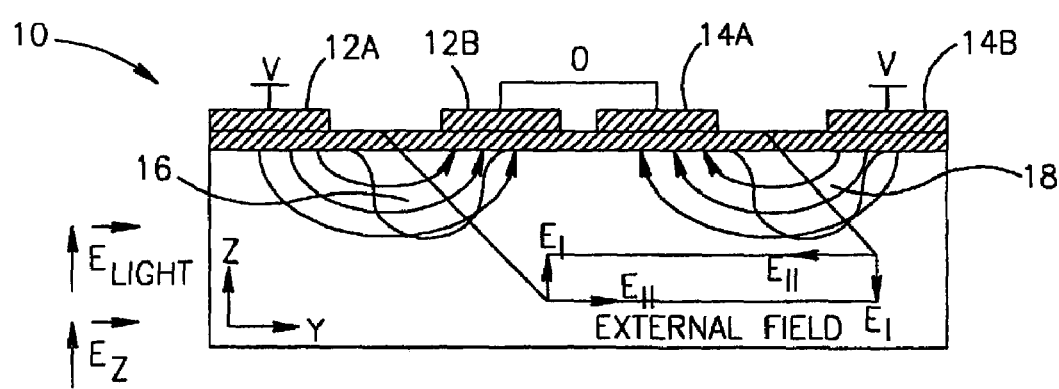

Since the specific configuration described above is characterized by greatly reduced polarization mixing, the implementation of this concept in a Mach-Zehnder amplitude modulator is conceivable. The proper device construction is shown in FIGS. 8a–8b illustrating an amplitude modulator 10 having a push-pull electrode-waveguide layout. The modulator 10 comprises two pairs of shifted electrodes 12A–12B and 14A–14B with respect of two waveguide channels 16 and 18.

The modulator 10 allows for change in sign of $\beta_2$ in both arms I and II (waveguide channels), and, correspondingly, for doubling the phase difference accumulated for a single operating voltage. As shown, a symmetrical disposition of the electrode shift reverts both the z- and y-components of the electrical field E. As shown, in the amplitude modulator 10 two waveguides are joined at the extremes to form Y-junctions, which is the basic requirement for amplitude modulation.

In the above publications (4) and (5), a polarization independent Mach-Zehnder configuration in z-propagating configuration has been disclosed. In that case, however, a higher voltage-length product is necessary (since the lower valued electro-optic coefficients $r_{22}$ and $r_{11}$ are involved) and, additionally, polarization mixing is unavoidable due to near TE-TM degeneracy and coupling via the $r_{51}$ coefficient.

Thus, the novel layout in waveguides fabricated on z-cut, x-propagating $LiNbO_3$ crystals provides essentially polarization-independent amplitude modulation. The device according to the invention utilizes a single voltage source to provide the required electric field control for polarization independent operation. The above-presented results indicate that this configuration has apparent advantages as compared to other approaches, mainly, in terms of voltage efficiencies and the absence of polarity conversion. The required fabrication tolerances are within custom micro-lithographic capabilities.

The advantages of the present invention are thus self-evident. Polarization independence of an electro-optical modulator can be achieved due to the provision of an appropriate electrode-waveguide layout, i.e., appropriate shift of the electrodes from the axis of the corresponding waveguide channel at a predetermined thickness of a buffer layer. This electrode-waveguide layout could be in principle applied to other integrated optical devices, e.g., active couplers.

It should be noted that some interferometric applications require that no polarization conversion takes place, as the result of the electro-optical interaction. This additional condition can be fulfilled in some cases. One possible situation consists of the use of an unperturbed crystal (e.g., GaAs), which is optically isotropic (cubic symmetry) and the polarization mixing components of the electro-optic tensor are either very small or even cancelled by proper choice of light propagation direction. In the example presented here, the unperturbed crystal (such as $LiNbO_3$) has large anisotropy, so that the TE and TM waveguide modes have large differences in phase velocity ($n_o \neq n_e$), making TE–TM conversion inefficient.

Figure 9A:
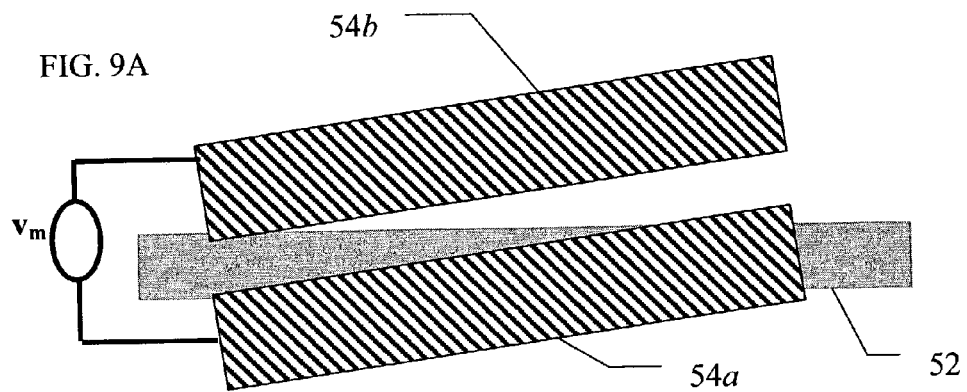
FIGS. 9a to 9c illustrate a number of further configurations of electrodes configured according to the teachings of the present invention to act distinctly on different polarizations of light propagating in a waveguide.
Figure 9B:
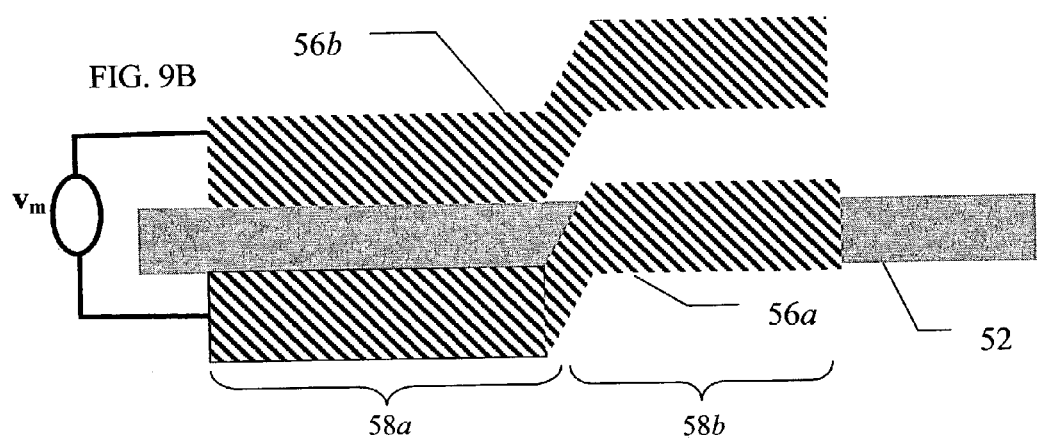
Figure 9C:
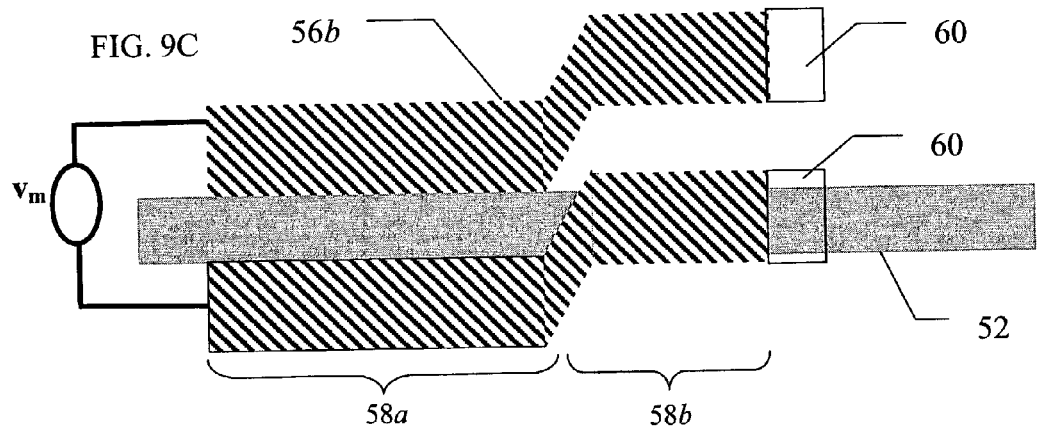

Turning now to FIGS. 9a–9c, it should be noted that the fundamental principle of the present invention, namely, to provide an electrode configuration in which a single activation voltage inherently acts substantially similarly on both TE and TM modes, can be implemented with a range of different electrode configurations. By way of non-limiting examples, three additional configurations for phase modulation will now be illustrated with reference to FIGS. 9a–9c.

Turning to FIG. 9a, this shows an electrode configuration in which a pair of electrodes 54a and 54b are deployed at an angle to the extensional direction of the underlying waveguide 52. This electrode configuration provides a transition (from left to right) from electrodes of the TE type to electrodes of TM type. The magnitude of the effect of the modulating voltage $V_m$ on each of the two polarization types depends upon a number of factors, including the dimensions of the electrodes and the angle formed between the direction of the waveguide and the extensional direction of the electrodes. These parameters are chosen such that a single actuation voltage applied between the electrodes results in substantially the same phase modulation effect on each polarization mode.

Turning now to FIG. 9b, this shows a further configuration in which a pair of electrodes 56a and 56b are subdivided into two parts along their length as measured parallel to the extensional direction of waveguide 52. In a first region 58a, the electrodes provide a TE type electrode configuration, while in a second region 58b they provide a TM type electrode configuration. The two sections of each electrode 56a and 56b are interconnected, preferably directly by an appropriately formed transition region conductor to form two contiguous electrodes as illustrated. The magnitude of the effect that the modulation voltage has on the phases of the two polarizations depends upon various parameters, including the lengths of the two sections. Thus, by appropriate choice of the relative lengths of regions 58a and 68b, the electrode configuration provides the required essentially balanced effect.

Finally, turning to FIG. 9c, it should be noted that configurations such as those of FIGS. 9a and 9b have advantages in providing the possibility of "tuning" of the modulator to provide the desired effect by "electrode trimming". In a typical implementation, the geometrical design of the electrodes and waveguides are determined by calculation or simulation modeling, and then implemented by use of a photolithography mask or set of masks to produce the optical modulator or switch using basically standard microelectronics techniques. Due to imperfections in the process or materials used, the balance in the modulation of the two polarizations in the final product may be sub-optimal. After characterizing the performance of the device, the length of each section can be suitably shortened by trimming its length. This is illustrated by the trimmed-away regions 60 in FIG. 9c which modify an electrode configuration otherwise similar to FIG. 9b. The trimming process can be repeated until the measurements exhibit balance between the effects on the two polarization components to a predefined degree of accuracy. Trimming of the electrode may be performed by various known techniques, such as by chemical etching or pulsed laser irradiation.

Those skilled in the art will readily appreciate that various modification and changes can be applied to the preferred embodiments of the invention as hereinbefore exemplified without departing from its scope as defined in and by the appended claims.

The invention claimed is:

1. An electro-optical device for modulation of light comprising:
    (a) a waveguide formed from optically active material deployed within at least one waveguide channel, a portion of said waveguide having a central axis of symmetry;
    (b) an electrode configuration including at least two electrodes deployed in operative relation to said portion of said waveguide,
    wherein said at least two electrodes are deployed asymmetrically relative to said central axis of symmetry with at least one of said electrodes overlapping said channel partially such that a sole actuation voltage applied between said at least two electrodes results in a substantially equal effect on both TE and TM polarized components of radiation propagating along said waveguide.

2. The device of claim 1, wherein said at least two electrodes are implemented as exactly two electrodes.

3. The device of claim 1, wherein a first of said electrodes is deployed in partially overlapping relation to said waveguide, and wherein a second of said electrodes is deployed in non-overlapping relation to said waveguide.

4. The device of claim 3, wherein each of said at least two electrodes has a direction of elongation parallel to said central axis of symmetry.

5. The device of claim 1, wherein at least one of said electrodes has a direction of elongation non-parallel to said central axis of symmetry.

6. The device of claim 1, wherein said at least two electrodes provide a first pair of electrode regions deployed such that said sole actuation voltage applied between said first pair of electrode regions affects primarily the TE polarized component of radiation propagating along said waveguide, said at least two electrodes further providing a second pair of electrode regions deployed such that said sole actuation voltage applied between said second pair of electrode regions affects primarily the TM polarized component of radiation propagating along said waveguide.

7. A method for modulating light comprising:
    (a) providing a waveguide formed from optically active material deployed within at least one waveguide channel, a portion of said waveguide having a central axis of symmetry;
    (b) providing an electrode configuration including at least two electrodes deployed in operative relation to said portion of said waveguide; and
    (c) actuating said electrode configuration by applying a sole actuation voltage between said at least two electrodes, wherein said at least two electrodes are deployed asymmetrically relative to said central axis of symmetry with at least one of said electrodes overlapping said channel partially such that said sole actuation voltage applied between said at least two electrodes results in a substantially equal effect on both TE and TM polarized components of radiation propagating along said waveguide.

8. The method of claim 7, wherein said at least two electrodes are implemented as exactly two electrodes.

9. The method of claim 7, wherein a first of said electrodes is deployed in partially overlapping relation to said waveguide, and wherein a second of said electrodes is deployed in non-overlapping relation to said waveguide.

10. The method of claim 9, wherein each of said at least two electrodes is deployed with a direction of elongation parallel to said central axis of symmetry.

11. The method of claim 7, wherein at least one of said electrodes is deployed with a direction of elongation non-parallel to said central axis of symmetry.

12. The method of claim 7, wherein said at least two electrodes are deployed to provide a first pair of electrode regions deployed such that said sole actuation voltage applied between said first pair of electrode regions affects primarily the TE polarized component of radiation propagating along said waveguide, said at least two electrodes further providing a second pair of electrode regions deployed such that said sole actuation voltage applied between said second pair of electrode regions affects primarily the TM polarized component of radiation propagating along said waveguide.

13. The method of claim 12, wherein said providing an electrode configuration includes:
(a) deploying an initial electrode configuration including said at least two electrodes;
(b) assessing whether said sole actuation voltage applied between said at least two electrodes results in a substantially equal effect on both TE and TM polarized components of radiation propagating along said waveguide to a predefined degree of accuracy; and
(c) if said effect is not equal to said predefined degree of accuracy, trimming at least one electrode from at least one of said pairs of regions so as to render said effect on both TE and TM polarized components of radiation equal to said predefined degree of accuracy.

* * * * *